UNITED STATES PATENT OFFICE 3,325,568
Patented June 13, 1967

3,325,568
DIPHOSPHATES OF XYLYLENE
Sidney B. Richter, Chicago, Ill., assignor to Velsicol Chemical Corporation, Chicago, Ill., a corporation of Illinois
No Drawing. Filed June 10, 1963, Ser. No. 286,466
9 Claims. (Cl. 260—930)

This invention relates to the production of new pesticidal compositions of matter. More specifically, this invention relates to new chemical compounds of the general formula

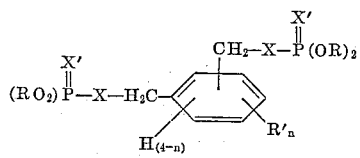

wherein X and X' are selected from the group consisting of sulfur and oxygen, at least one of X and X' always being sulfur; R is lower alkyl; n is a whole number from 0 to 2; and R' is selected from the group consisting of nitro, lower alkyl, lower alkoxy and lower alkylthio. These new compounds have been found to be valuable as pesticides, particularly as insecticides and miticides. In the compounds of this invention defined by the above general formula, the lower alkyl, lower alkoxy, and lower alkylmercapto groups are those which contain up to four carbon atoms. Preferred members of said groups are those which are unsubstituted and acyclic.

The new compounds of this invention can be prepared readily from the various appropriately substituted xylylene dihalides

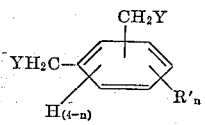

wherein R' and n are as defined above and Y is chlorine or bromine. These xylylene dihalides, which may be named more formally as alpha,alpha'-dihaloxylenes, include such known compounds as 2,5-dimethoxy-m-xylylene dibromide, 5-nitro-m-xylylene dibromide, 2-ethyl-5-nitro-m-xylylene dichloride, 5-tert-butyl-m-xylylene dibromide, 3,6-dimethoxy-o-xylylene dibromide, 2,5-dimethoxy-p-xylylene dichloride, 5-methyl-m-xylylene dichloride, 2,5-diethoxy-p-xylylene dichloride, 2,5-diethyl-p-xylylene dichloride, 2,5-dipropoxy-p-xylylene dichloride, 2,5-dibutoxy-p-xylylene dichloride, and the like.

The new compounds of this invention can be prepared by the reaction of such appropraitely substituted xylylene dihalides with compounds of the formulas

or $(RO)_2P(O)$—S—Z, wherein R is as defined above and Z is an alkali metal or hydrogen. The choice of the particular sulfur and phosphorous containing reactant will depend on the nature and positions of these elements desired in the compounds according to this invention.

While it is suitable to make use of at least two molar proportions of the phosphorous acid or salt for each molar proportion of the substituted xylylene dihalide, it is preferred to use an excess of the phosphorous compound. When the phosphorous compound is used in the form of one of its salts, wherein Z is an alkali metal, the reactants can simply be combined in a suitable inert solvent. If the phosphorous compound is used in the form of its free acid, however, wherein Z is hydrogen, a basic condensing agent such as pyridine should be used in the reaction mixture. The reaction temperature is not critical, but temperatures between about normal room temperature and the reflux temperature of the reaction mixture are preferred. The reactions are ordinarily carried out at normal atmospheric pressure, but sub- or superatmospheric pressures can also be used if desired.

The course of the reaction can be followed by the use of infrared spectrophotometric analysis, for example. The product can be isolated by filtering off any inorganic salts which may have formed, extracting or distilling off any unreacted phosphorous compound, and finally distilling off the solvent. The residue so obtained will often be sufficiently pure for pesticidal use as such; but it can be purified by any recognized techinique known to the art, such as chromatography, crystallization, or fractional distillation. The manner in which typical new compounds of this invention can be prepared is illustrated in the following examples. All temperatures are in degrees centigrade.

EXAMPLE 1

Preparation of bis(O,O-dimethyl) p-xylylene phosphorodithioate

A solution of p-xylylene dichloide (35 g.; 0.2 mole) in 200 ml. benzene was treated with O,O-dimethyl dithiophosphoric acid (70 g.; 0.44 mole) in a 500-ml., 3-neck flask fitted with a mechanical stirrer and reflux condenser. Pyridine (35 g.; 0.44 mole) was then added slowly, whereupon a fairly vigorous reaction took platce and the mixture separated into two layers. The reaction mixture was stirred and refluxed for four hours and poured into water. The benzene layer was separated, washed with water, then with sodium carbonate solution, twice with water, and finally with saturated sodium chloride solution. The solution was dried over sodium sulfate and filtered. Stripping the solvent under a water pump vacuum and then for three hours to 110° with the vacuum pump gave a slightly turbid residue, which was filtered through Super Cel to yield 9 g. of bis (O,O-dimethyl) p-xylylene phosphorodithioate, $n_D^{33}$ 1.5834.

Analysis for $C_{12}H_{20}O_4P_2S_4$.—Theory: P, 14.8%; S, 30.6. Found: P, 14.0%; S, 31.1.

EXAMPLE 2

Preparation of 2-nitro-p-xylylene dichloride p-Xylylene dichloride (35 g.; 0.2 mole) was added in portions with shaking over a period of about 45 min. to 100 ml. of 90% fuming nitric acid, which had been cooled previously to 0° in an ice-salt bath. The temperature of the reaction mixture was kept below 10° during the addition. The mixture was then maintained at 0–5° for four hours, poured into ice water, and stirred to solidify the oil which came out of solution. The solid was filtered, washed with water, and dried in the air. Attempts to crystallize the crude solid failed; so the residue from evaporation of the solvents was taken up in ether, washed twice with water and then with saturated NaCl solution, dried over magnesium sudfate, filtered, and the ether evaporated. The residue distilled at 139–47°/0.3 mm., largely at 147°. The distillate was taken up in hot methanol and chilled in Dry Ice to give a solid, which was washed with cold methanol and taken up in hot hexane. Cooling of the hexane gave the first crop of crystals, and the filtrates were concentrated and worked up to give a combined yield from three crops of 28 g. of 2-nitro-p-xylylene dichloride, M.P. 34.7°.

Analysis for $C_8H_7Cl_2NO_2$.—Theory: C, 44.2%; H, 3.2%; Cl, 32.3%; N, 6.4. Found: C, 44.0%; H, 3.3%; Cl, 32.4%; N, 6.5.

EXAMPLE 3

Preparation of bis(O,O-dimethyl) nitro-p-xylylene phosphorodithioate

A mixture of 2-nitro-p-xylylene dichloride (11 g.; 0.05 mole), potassium O,O,-dimethyl dithiophosphate (22 g.; 0.11 mole), and 100 ml. acetone was stirred and refluxed for 18 hours. The reaction mixture was cooled and filtered, and the precipitate was washed with acetone. The combined filtrates were reduced in volume and dissolved in benzene. The benzene solution was washed thrice with saturated NaCl solution, dried over magnesium sulfate, and filtered. The solvent was distilled off under a water pump vacuum. The residue was then pumped out over night with the water pump and then for four hours on the vacuum pump and filtered through Hyflo Super Cel to give 15 g. of bis(O,O-dimethyl) nitro-p-xylylene phosphorodithioate, $n_D^{29}$ 1.6044.

Analysis for $C_{12}H_{19}NO_6P_2S_4$.—Theory: N, 3.0%; P, 13.4%; S, 27.7%. Found: N, 3.1%; P, 12.5%; S, 27.8%.

A wide variety of other new compounds within the scope of this invention can be prepared in a manner similar to that detailed above. In the following examples are given the reactants which can be used to prepare the indicated named compounds of this invention.

EXAMPLE 4

2-nitro-p-xylylene dichloride $$+(CH_3O)_2P(S)—O—Na=$$

Bis(O,O-dimethyl) O,O - (nitro - p - xylylene phosphorothioate.

EXAMPLE 5

2-nitro-p-xylylene dichloride $$+(CH_3O)_2P(O)—S—Na=$$

Bis(O,O-dimethyl) S,S - (nitro - p - xylylene) phosphorothioate.

EXAMPLE 6

5-nitro-m-xylylene dibromide $$+(CH_3O)_2P(S)—S—Na=$$

Bis(O,O-dimethyl) 5-nitro-m-xylylene phosphorothioate.

EXAMPLE 7 p-Xylylene dichloride $$+(CH_3O)_2P(S)—O—Na=$$

Bis(O,O-dimethyl) O,O-p-xylylene phosphorothioate.

EXAMPLE 8 p-Xylylene dichloride $$+(CH_3O)_2P(O)—S—Na=$$

Bis(O,O-dimethyl) S,S-p-xylylene phosphorothioate.

EXAMPLE 9

5-methyl-m-xylylene dichloride $$+(CH_3O)_2P(S)—S—Na=$$

Bis(O,O-dimethyl) 5 - methyl - m - xylylene phosphorothioate.

EXAMPLE 10

5-methyl-m-xylylene dichloride $$+(CH_3O)_2P(O)—S—Na=$$

Bis(O,O-dimethyl) O,O-(5 - methyl - m - xylylene) phosphorothioate.

EXAMPLE 11

5-methyl-m-xylylene dichloride $$+(CH_3O)_2P(O)—S—Na=$$

Bis(O,O-dimethyl) S,S-(5 - methyl - m - xylylene) phosphorothioate.

EXAMPLE 12

5-tert-butyl-m-xylylene dibromide $$+(CH_3O)_2P(S)—S—Na=$$

Bis(O,O-dimethyl) 5-tert-butyl - m - xylylene phosphorothioate.

EXAMPLE 13

2-methoxy-p-xylylene dichloride $$+(CH_3O)_2P(S)—S—Na=$$

Bis(O,O-dimethyl) methoxy - p - xylylene phosphorodithioate.

EXAMPLE 14

2-methylthio-p-xylylene dichloride $$+(CH_3O)_2P(S)—S—Na=$$

Bis(O,O-dimethyl) methylthio - p - xylylene phosphorodithioate.

EXAMPLE 15 p-Xylylene dichloride $$+(n-C_4H_9O)_2P(S)—S—Na=$$

Bis(O,O-di-n-butyl) p-xylylene phosphorodithioate.

EXAMPLE 16

2-nitro-p-xylylene dichloride $$+(C_2H_5O)_2P(S)—S—Na=$$

Bis(O,O-diethyl) nitro-p-xylylene phosphorodithioate.

EXAMPLE 17

2-nitro-p-xylylene dichloride $$+(iso-C_3H_7O)_2P(S)—S—Na=$$

Bis(diisopropyl) nitro-p-xylylene phosphorodithioate.

EXAMPLE 18 o-Xylylene dichloride $$+(CH_3O)_2P(S)—S—Na=$$

Bis(O,O-dimethyl) o-xylylene phosphorodithioate.

For practical use as insecticides, the compounds of this invention are generally incorporated into insecticidal compositions which comprise an inert carrier and an insecticidally toxic amount of such a compound. Such insecticidal compositions, which can also be called formulations, enable the active compound to be applied conveniently to the site of the insect infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

EXAMPLE 19

*Preparation of a dust*

Product of Example 3 _____ 10
Powdered talc _____ 90

The above ingredients are mixed in a mechanical grinder-blender and are ground until a homogeneous, free-flowing dust of the desired particle size is obtained. This dust is suitable for direct application to the site of the insect infestation.

The insecticides of this invention can be applied in any manner recognized by the art. The concentration of the new compounds of this invention in the insecticidal compositions will vary greatly with the type of formulation and the purpose for which it is designed, but generally the insecticidal compositions will comprise from about 0.05 to about 95 percent by weight of the active compounds of this invention. In a preferred embodiment of this invention, the insecticidal compositions will comprise from about 5 to about 75 percent by weight of the active compound. The compositions can also comprise such additional substances as other pesticides, spreaders, adhesives, stickers, fertilizers, activators, synergists, and the like.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are positioned systemically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy worm. There are also the piercing-sucking insects, such as the pea aphid, the housefly, the chinch bug, leafhoppers, and plant bugs.

Another group of insects comprises the internal feeders. These include borers such as the European corn borer and the corn earworm; worms or weevils such as the codling moth, cotton boll weevil, plumb curculio, melonworm, and the apple maggot; leaf miners such as the apple leaf miner and beet leaf miner; and gall insects such as the wheat jointworm and grape phylloxera. Insects which attack below the surface of the ground are classified as subterranean insects and include such destructive pests as the woolly apple apid, the Japanese beetle, and the corn rootworm.

Mits and ticks are not true insects. Many economically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

The toxicity of the compounds of this invention to insects and mites can be shown by a variety of test methods known to the art. For example, experiments were carried out in which lima bean leaves sprayed on the dorsal and ventral surfaces with aqueous emulsions of test compounds were offered to the Mexican bean beetle (late second instar) for a forty-eight hour feeding period. At the end of this time, there was 100% mortality of the Mexican bean beetles which had been exposed to leaves sprayed with a 0.35% emulsion of the product of Example 1, bis(O,O-dimethyl) p-xylylene phosphorodithioate. There was no evidence of mortality in an untreated control.

Another series of experiments were carried out in which lima bean plants were each infested with fifty to one hundred adults of the strawberry spider mite, *Tetranychus atlanticus*. The infested plants were dipped into aqueous emulsions of the test compounds, held for five days, and observed for adult mortality. In these tests, the compound bis(O,O-dimethyl) p-xylylene phosphorodithioate at a concentration of 0.35% gave 100% mortality of the mites, while there was no mortality in an untreated control.

In addition, adult pea aphids were sprayed with aqueous emulsions of test compounds, transferred to sprayed pea plants, and held for determination of mortality in forty-eight hours. In these tests, the product of Example 3, namely bis(O,O-dimethyl) nitro-p-xylylene phosphorodithioate, gave 100% mortality of the pea aphids at a concentration of 0.35%. There was no mortality in an untreated control.

What is claimed is:

1. A compound of the general formula

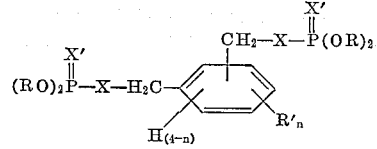

wherein X and X' are selected from the group consisting of sulfur and oxygen, at least one of X and X' always being sulfur; R is lower alkyl; n is a whole number from 0 to 2; and R' is selected from the group consisting of nitro, lower alkyl, lower alkoxy, and lower alkylthio.

2. A compound as described in claim 1, wherein X and X' are sulfur.

3. A compound as described in claim 1, wherein X is sulfur and X' is oxygen.

4. A compound as described in claim 1, wherein X is oxygen and X' is sulfur.

5. Bis(O,O-dimethyl) p-xylylene phosphorodithioate.

6. Bis(O,O-dimethyl) nitro-p-xylylene phosphorodithioate.

7. Bis(O,O-dimethyl) O,O-(nitro-p-xylylene) phosphorothioate.

8. Bis(O,O-dimethyl) S,S-(nitro-p-xylylene) phosphorothioate.

9. Bis(O,O-diisoproyl) nitro-p-xylylene phosphorodithioate.

References Cited

UNITED STATES PATENTS

| | | | |
|---|---|---|---|
| 2,643,265 | 6/1953 | Fon Toy | 260—461 |
| 2,995,487 | 8/1961 | Jones | 167—30 |
| 3,005,749 | 10/1961 | Youngson | 167—30 |
| 3,089,891 | 5/1963 | Birum | 260—461 |

CHARLES B. PARKER, *Primary Examiner.*

JOSEPH P. LEVITT, *Examiner.*

G. A. MENTIS, A. H. SUTTO, *Assistant Examiners.*